US009602589B1

(12) United States Patent
Jackson et al.

(10) Patent No.: US 9,602,589 B1
(45) Date of Patent: Mar. 21, 2017

(54) SYSTEMS AND METHODS FOR DETERMINING ROOM TYPES FOR REGIONS OF A MAP

(71) Applicant: Google Inc., Mountian View, CA (US)

(72) Inventors: Dean Kenneth Jackson, Pittsburgh, PA (US); Daniel Victor Klein, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 292 days.

(21) Appl. No.: 14/453,760

(22) Filed: Aug. 7, 2014

(51) Int. Cl.
G06F 15/16 (2006.01)
H04L 29/08 (2006.01)
G06F 17/30 (2006.01)

(52) U.S. Cl.
CPC ........ H04L 67/10 (2013.01); G06F 17/30598 (2013.01)

(58) Field of Classification Search
CPC ........................... H04L 67/10; G06F 17/30598
See application file for complete search history.

(56) References Cited

U.S. PATENT DOCUMENTS

| 7,158,931 | B2 | 1/2007 | Allegro |
| 7,663,671 | B2 | 2/2010 | Gallagher et al. |
| 2004/0001154 | A1* | 1/2004 | Obrador ............ G06F 17/30265 348/231.2 |
| 2006/0031426 | A1* | 2/2006 | Mesarina ............... G01D 21/00 709/220 |
| 2009/0309728 | A1* | 12/2009 | Yamamura ......... G08B 13/1672 340/568.1 |
| 2011/0121963 | A1 | 5/2011 | Prehofer |
| 2012/0224457 | A1* | 9/2012 | Kim ........................ H04L 67/18 367/137 |
| 2013/0063611 | A1* | 3/2013 | Papakipos ............. G06F 1/1686 348/207.11 |
| 2013/0102334 | A1 | 4/2013 | Khorashadi et al. |
| 2013/0342565 | A1 | 12/2013 | Sridhara et al. |
| 2014/0161270 | A1* | 6/2014 | Peters ..................... G10L 25/51 381/63 |
| 2014/0361904 | A1* | 12/2014 | Gaboury .................. G08B 3/10 340/692 |

(Continued)

OTHER PUBLICATIONS

Lei et al., "Multimodal City-Verification of Flickr Videos Using Acoustic and Textual Features", 2012 IEEE International Conference on Acoustics, Speechand Signal Processing (ICASSP), Mar. 25-30, 2012, Kyoto, p. 2273-2276.

Primary Examiner — Brian P Whipple
(74) Attorney, Agent, or Firm — Dority & Manning, P.A.

(57) ABSTRACT

Systems and methods for determining room types for regions of a map are provided. One example method includes determining, by a client computing device, a current location of the client computing device. The method includes obtaining, by the client computing device, one or more audio samples describing ambient audio around the client computing device. The method includes analyzing, by the client computing device, the one or more audio samples to identify one or more room characteristics associated with the current location of the client computing device. A room type is identified for a room associated with the current location of the client computing device based at least in part on the one or more room characteristics. One example system includes a plurality of client computing devices and one or more server computing devices.

20 Claims, 4 Drawing Sheets

(56) References Cited

U.S. PATENT DOCUMENTS

| | | | | |
|---|---|---|---|---|
| 2015/0032456 A1* | 1/2015 | Wait | ............... | H04L 12/282 |
| | | | | 704/275 |
| 2015/0049086 A1* | 2/2015 | Morato | ............... | G06T 15/04 |
| | | | | 345/427 |
| 2015/0373468 A1* | 12/2015 | Shayandeh | ............ | H04R 29/00 |
| | | | | 381/56 |

* cited by examiner

SYSTEMS AND METHODS FOR DETERMINING ROOM TYPES FOR REGIONS OF A MAP

FIELD

The present disclosure relates generally to determining room types for regions of a map. In particular, the present disclosure relates to systems and methods for determining room types for regions of a map using audio sampling and analysis.

BACKGROUND

Maps can be useful for navigation, exploration, routing, and many other functions. In particular, certain existing systems may allow a client computing device, such as, for example, a smartphone, to communicate with a server of a mapping application or geographic information system to receive a map describing a geographic area (e.g. the area surrounding the current location of the client computing device as a user of the client computing device moves about in the world). Thus, the user can employ the client computing device to receive maps which may assist the user or the client computing device in performing any of the functions mentioned above.

Furthermore, while maps have traditionally described outdoor locations such as roadways, parks, or bodies of water, indoor maps are becoming increasingly available. In particular, certain techniques exist for manually or automatically generating floorplans describing regions of an indoor space (e.g. rooms of a building). For example, a floorplan may be made available for a mall, office building, home, museum, or other similar indoor spaces. The floorplan can optionally be added to or otherwise included in some or all maps describing such building, such as, for example, the maps that are provided by the server of the mapping application or geographic information system. A map including floorplans of indoor spaces may be useful for certain functions.

However, for many of the above noted functions, a simple description of a floorplan, absent other contextual information such as room type, does not provide sufficient information to realize the full utility of a map. For example, if provided a floorplan of an office building without any additional context, such as room type or room utility, a user of the map is unable to determine how to reach certain offices, conference rooms, the cafe, a restroom, or other rooms having particular utility. Thus, maps that include room type information for indoor spaces provide enhanced utility versus maps that do not provide such information.

SUMMARY

Aspects and advantages of the present disclosure will be set forth in part in the following description, or may be apparent from the description, or may be learned through practice of embodiments of the present disclosure.

One example aspect of the present disclosure is directed to a system for determining room types. The system includes a plurality of client computing devices. Each of the plurality of client computing devices performs first operations. The first operations include determining a current location of the client computing device. The first operations include obtaining an audio sample of ambient audio at the current location of the client computing device. The first operations include identifying one or more room characteristics associated with the current location of the client computing device based at least in part on the audio sample. The first operations include providing the current location of the client computing device and the one or more identified room characteristics to one or more server computing devices. The system includes the one or more server computing devices. The server computing devices perform second operations. The second operations include receiving room characteristics for a plurality of different locations from the plurality of client computing devices. The plurality of different locations respectively correspond to a plurality of different rooms of one or more buildings. The second operations include identifying all received room characteristics for a first room of the plurality of rooms. The second operations include determining a first room type for the first room based at least in part on the received room characteristics for the first room.

Another example aspect of the present disclosure is directed to a computer-implemented method for determining room types. The method includes determining, by one or more computing devices, a current location of the client computing device. The method includes obtaining, by the one or more computing devices, one or more audio samples describing ambient audio around a client computing device. The method includes identifying, by the one or more computing devices, one or more room characteristics associated with the current location of the client computing device based at least in part on the one or more audio samples. The method includes identifying, by the one or more computing devices, a room type for a room associated with the current location of the client computing device based at least in part on the one or more room characteristics. The method includes modifying, by the one or more computing devices, map data to associate the room type with the room.

Another example aspect of the present disclosure is directed to one or more non-transitory computer-readable media storing instructions that, when executed by one or more computing devices, cause the one or more computing devices to perform operations. The operations include determining a current location of a client computing device. The operations include collecting an audio sample describing audio occurring at the current location. The operations include determining one or more room characteristics based at least in part on the audio sample. The operations include providing the one or more room characteristics and the current location to one or more server computing devices. The one or more server computing devices identify a room based at least in part on the current location and determine a room type for the room based at least in part on the one or more room characteristics.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Overview

Figure 1:
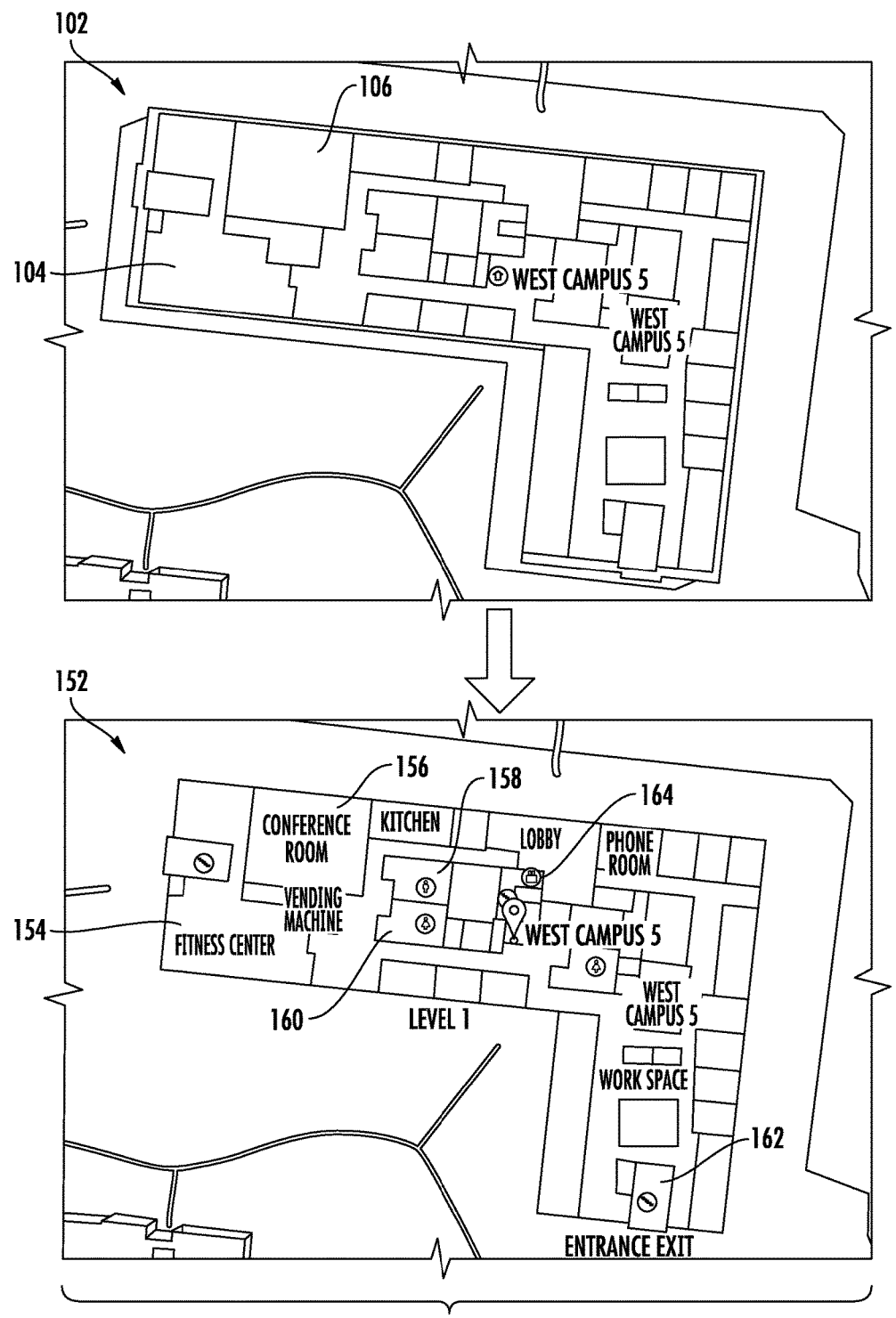
FIG. 1 depicts an example determination of room types for regions of a map according to an example embodiment of the present disclosure.

The present disclosure is directed to systems and methods for determining room types for regions of a map. For example, a preexisting indoor map can describe spatial boundaries of rooms of a building, but fail to provide a room type (e.g. office, kitchen, restroom, restaurant) or other context for each room. Using a combination of geolocation, audio sampling and signaling, and digital signal processing, a room type for each room of the map can be identified.

In particular, as an example, a client computing device can determine its current location; obtain one or more audio samples describing ambient audio around the client computing device; and analyze the one or more audio samples to identify one or more room characteristics associated with its current location. The client computing device can upload or otherwise provide its current location and the one or more room characteristics to one or more servers.

The servers can receive such uploads from many different client computing devices and analyze the aggregate received information to determine a room type for each of a plurality of rooms. For example, the servers can compare the location associated with each reporting of room characteristics with a preexisting indoor map to identify a particular room that the reported room characteristics describe. By analyzing all reported characteristics for a room, the servers can determine a room type for the room. For example, machine learning techniques can be used to train a classifier on room characteristic data describing rooms having known room types. The trained classifier can be used to classify an unknown room as belonging to one of a plurality of different room types.

In addition, other forms of data such as, for example, imagery captured by the client computing devices, device user characteristics, device location histories, device orientation data, or other information can be used in combination with the audio sample analysis to assist in determining room types, room dimensions, or other room information such as the location of certain sub-structures (e.g. walls, sinks, entry and exit ways, etc.). Thus, the systems and methods of the present disclosure can leverage periodic audio sampling and analysis by a plurality of client computing devices to determine room types, thereby enhancing the utility of the indoor map.

More particularly, a client computing device (e.g. a tablet, smartphone, wearable computing device, or other such devices) can employ a microphone to periodically collect an audio sample describing ambient audio around the client computing device. For example, the client computing device can passively collect samples of the ambient audio.

As another example, in some embodiments, the client computing device can be configured to collect the audio samples whenever the device sounds an alert tone that indicates to a user of the client computing device that a communication has been received at the client computing device. For example, in the instance that the client computing device is a smartphone, the smartphone can be configured to collect an audio sample whenever the smartphone rings for an incoming call or provides a notification tone for an incoming text message, received electronic mail message, or other notification.

In particular, the collected audio sample can include an echo of the alert tone. Such echo can be indicative of certain room characteristics. For example, the echo can provide information regarding spatial characteristics of the room, material characteristics of the room (e.g. wall hardness or material type), room clutter, or spatial orientation of the client computing device within the room. Thus, the periodic sounding of an alert tone by the client computing device can be leveraged to identify certain room characteristics.

As another example, in some embodiments, the client computing device can be configured to periodically sound an exploratory noise, such as, for example, a ping noise, a chirp noise, or some other noise. In some embodiments, the exploratory noise can be an ultrasonic noise. In particular, the client computing device can sound the exploratory noise and then collect an audio sample that includes an echo of the exploratory noise. Such echo can be indicative of certain room characteristics. Thus, the client computing device can actively or passively collect audio samples which include information about the room.

In some embodiments, the client computing device can be configured to sound exploratory noises only when certain criteria are satisfied. For example, time of day, a volume of ambient noise, and/or recent motion of the client computing device can be criteria that must be satisfied for the client computing device to sound an exploratory noise. Thus, for example, a client computing device may not sound an exploratory noise at midnight in a quiet room, but may sound the exploratory noise at noon in a room with one or more active conversations.

It yet further embodiments, client computing devices may feature a plurality of microphones. Given knowledge of the orientation of the client computing device (e.g. obtained through accelerometer data, gyroscope data, or other techniques) the plurality of microphones can be used to spatially locate a sound with binaural location. For example, location of the sound can be performed similarly to human hearing and perception of location/directionality.

Thus, in some embodiments, in order to obtain the benefits of the techniques described herein, the user may be required to install an application and/or select a setting to allow the collection and analysis of ambient audio information, location information associated with the user or her device, and/or other information concerning certain attributes of the user. If the user does not, then the benefits of the techniques described herein may not be received.

According to an aspect of the present disclosure, the client computing device can analyze one or more of the obtained audio samples to identify one or more room characteristics associated with the current location of the client computing device. Additionally or alternatively, the client computing device can upload the obtained audio samples to one or more server computing devices, and the one or more server computing devices can perform the audio sample processing.

As an example, the audio samples can be analyzed to determine one or more spatial characteristics that describe spatial qualities of the current location of the client computing device. For example, the spatial characteristics can indicate whether the client computing device is currently located in a large space, a small space, a long hallway with significant echo, or other spatial characteristics.

As another example, the audio samples can be analyzed to determine one or more occupancy characteristics of the current location of the client computing device. The occupancy characteristics can describe a human occupancy associated with the current location of the client computing device. For example, the occupancy characteristics can indicate a number of people speaking, a volume at which people are speaking, a number of stationary people, and/or a number of moving people in the adjacent area. As another example, the audio samples can be analyzed to determine whether music is playing, whether an HVAC system is operating, or whether other sounds are presented that are associated with various activities.

In some embodiments, occupancy characteristics can be determined by correlating a change in location or volume of a particular speech signal with changes in a location of client computing device. For example, a change in the location of the client computing device without a corresponding change in the location of multiple persons may be dismissed as GPS signal variation, while speakers or other human noise (e.g. footwear scuffling or walking noise) moving with pseudo-Brownian motion can indicate loitering or waiting for an event (e.g. train arrival).

In some embodiments of the present disclosure, specific sounds can be identified within collected audio samples. For example, a running sink, a fire alarm, clinking of silverware, typing on a keyboard, operation of a vending machine, or other unique sounds can be identified. For example, the audio signal can be compared to characteristic sound profiles included in a database to identify one or more specific sounds. The identified specific sounds can be used to assist in identifying a room type. For example, sink sounds may indicate that the room is a restroom or kitchen while clinking of silverware may indicate that the room is a dining room or kitchen. As another example, upon detection of the specific sound of a fire alarm, location data collected from the device thereafter may be useful for identifying the location of stairways, building exits, or other regions potentially designated as emergency exit pathways.

In some embodiments of the present disclosure, prior to analyzing a collected audio sample, the client computing device can determine whether the collected audio sample is sufficiently clear to warrant analysis. As an example, the client computing device can analyze the audio sample to determine whether the client computing device is enclosed within a muffling enclosure, such as, for example, a pocket, handbag, or purse. For example, further analysis or sample collection can be declined for audio samples that exhibit a characteristically muffled sound profile. As another example, image information (e.g. brightness or depth information) collected by a camera of the client computing device can be used to determine whether the device is enclosed within an enclosure.

As previously noted, in various embodiments of the present disclosure, processing or other analysis of audio samples can be performed at each client computing device or can be performed by a central processor to which the samples are uploaded. In some embodiments, audio sample processing can occur at either location and the location of processing can be influenced by various criteria.

As an example, in some embodiments, the location of processing can be determined based on whether the audio sample includes human speech. For example, the client computing device can initially process each obtained sample to determine whether such sample includes human speech. If the sample does include human speech, then the sample can be processed locally at the client computing device. However, if the audio sample does not include human speech, then the sample can be uploaded to the servers and processed at the servers. In such fashion, audio samples which may include personal or private information included in human speech can be kept private, while audio samples that include only random noise may be uploaded for further analysis.

After analyzing the audio sample to identify one or more room characteristics, the client computing device can upload the one or more room characteristics to one or more server computing devices. In some embodiments, the room characteristic information can be uploaded in an anonymous fashion. For example, the upload can provide only a location and identified room characteristics. Further, in some embodiments, audio samples are processed by the client computing devices in real time and are not stored, thereby enhancing user privacy.

In other embodiments, the client computing device can provide identification information to the servers in addition to the location and room characteristics. The identification information can be used to more precisely categorize the room by obtaining additional information about the client computing device or its user that may assist in identifying the room type for the room, such as, for example, location traces or user characteristics.

In yet further embodiments, additional data contemporaneously collected with the audio samples can be uploaded to the servers along with the determined room characteristics. For example, the additional data can include imagery collected by a camera of the client computing devices, data indicating a current orientation of the client computing devices, barometric pressure change data (e.g. to indicate a change in elevation due to stair or elevator usage), or other information. The additional data can assist in determining room types.

When multiple client computing devices implement the above discussed procedures, the server computing devices can receive uploads describing room characteristics that correspond to many different locations. The server computing devices can segment the received room characteristics into groups that respectively correspond to different regions of a map (e.g. rooms of a building).

As an example, in some embodiments, the server computing devices can compare the location associated with a set of room characteristics uploaded by a client computing device to a preexisting indoor map. The location can have been uploaded to the server computing devices by the client computing device within the same transmission or communication as the uploaded room characteristics. Alternatively or additionally, the location may have been provided by the client computing device to a different set of server computing devices that collect location readings to maintain a location history for the client computing device. In such embodiments, the location can be obtained from the location history based on an upload time or an audio sampling time associated with the room characteristics.

The location can be a fine-grained geolocation that includes, for example, vertical information such as elevation or an indication of a floor level. In some embodiments, the indoor map can include boundaries defining a plurality of rooms. In other embodiments, the indoor map may simply divide a building into a series of regions that are subject to refinement based on the uploaded room characteristics or audio samples. By comparing the location associated with each set of room characteristics to the indoor map, the received uploads can be segmented or otherwise sorted into groups that respectively correspond to the plurality of rooms.

The server computing devices can analyze all room characteristics provided for a particular room or region to determine a room type for the room or region. As an example, certain combinations of characteristics may indicate that the room is of a particular type. For example, if the room characteristics reported for a certain room consistently indicate that the room is relatively small, quiet (e.g. little to no conversation), has hard walls or floors that cause echoing, and frequently includes the sound of a sink, then such combination of characteristics can indicate that the room is a restroom. As another example, if the room characteristics reported for a certain room in a museum indicate that the room is relatively noisy as compared to other rooms in the museum, features multiple conversations, and includes the sound of silverware, food distribution items, and/or cooking items then such combination of characteristics can indicate that the room is a cafe or restaurant.

Additional information beyond audio analysis can also be used to assist in the initial room type determination or verify a previous room type determination. As an example, location traces or location histories for client computing devices can be used to assist in determining hours of use for a certain room. For example, if the location histories indicate a large number of devices visiting the room, but only during the hours of Monday through Friday, 8 AM to 6 PM, then such information may assist in characterization of the room as being office space or related room types. Likewise, rooms that are used overnight are more likely to be bedrooms, dormitories, hotel rooms, etc. Such information can be used in conjunction with audio analysis to collect a more accurate portrait of room characteristics.

In a similar fashion, location information can be used in combination with observable transitions between reported room characteristics to identify room entry and exit ways. As another example, audio samples and/or room characteristics collected contemporaneously by client computing devices that are within a threshold distance from each other can be analyzed in unison to assist in determining room boundaries. For example, if two mobile devices that are co-located hear the same sounds, it is likely that they are within the same room. However, if such devices do not hear the same sounds despite being co-located, then there is likely a wall positioned between them. Likewise, multiple client computing devices being turned off within a short period of time can indicate that the room is a performance room such as a movie theater or theatre venue.

As yet another example, in some embodiments, if two client computing devices are located approximate to one another (e.g. within a threshold distance) then one of the client computing devices can sound an exploratory sound. The other client computing device can be instructed to listen for the exploratory sound and can provide the server devices with an indication of whether the exploratory sound was heard or not. Other characteristics such as received exploratory sound volume may be reported as well. The provided information can assist the server computing devices in determining the presence and/or location of one or more room boundaries. For example, if the second client computing device heard the exploratory noise, then the two client devices are likely in the same room. However, if the second client computing device did not hear the exploratory noise, then there is likely a room boundary (e.g. wall) between the two client computing devices.

According to another aspect of the present disclosure, in some embodiments, a room type can be determined for a room through the use of a classifier that has undergone supervised training. In particular, the classifier may have been trained on room characteristic data associated with known room types. As an example, a client computing device can be used to collect one or more audio samples in each room of one or more buildings for which room types have previously been assigned. Room characteristics can be determined for each of the audio samples. Thus, a library of room characteristics having a known room type association can be built and can be used to train a classifier. In such fashion, the classifier can be trained to classify a room of unknown type on the basis of aggregate room characteristic data received from the plurality of client computing devices.

After a room type has been determined for a region of a map, the map or its associated data can be modified so that the room type is assigned to such region. Thus, when users of a mapping application access the map, additional information such as room type can be provided, increasing the utility of the map. Furthermore, the assigned room types can influence indoor routing, robotic pathway determination, or other functional tasks that leverage an indoor map.

Although room type determination has been discussed herein as being performed at the server computing devices, in some embodiments, the client computing devices can perform room type determination locally and provide the determined room type to the server computing devices, rather than providing room characteristics. As another example, a plurality of client computing devices operating as a peer group can perform audio sample analysis and room type determination.

According to another aspect of the present disclosure, in some embodiments, if a client computing device is determined to be within a room that has already been classified into a room type, the client computing device may perform additional operations to provide additional information about the room.

As an example, when it is determined that the client computing device is located in a room for which a room type has previously been determined, the server computing devices may provide instructions to the client computing device to listen for one or more specific sounds associated with such room type. For example, if it is determined that the client computing devices currently located in a kitchen, then the client computing device may be instructed to listen for the sound of a sink or other kitchen-specific sounds.

Upon hearing one or more of the specific sounds, the client computing device can provide an indication to the server computing devices. In some embodiments, the indication provided upon hearing one of the specific sounds can include an indication of the current location and the current orientation of the client computing device. Using such information, the client computing device and/or the server computing devices can determine the location of one or more sub-structures of the room. For example, the location of the sink within the kitchen may be identified. Other information such as wall location may be discernable as well.

Thus, the systems and methods of the present disclosure can be used to determine room types for regions of a map, such as rooms of an indoor map. In particular, through a combination of geolocation and audio sampling performed by a plurality of client computing devices, a significant number of room characteristics for various spaces can be determined and provided to a central authority (e.g. one or more server computing devices). By considering such room characteristics in aggregate (e.g. through the use of machine learning techniques), the central authority can assign a room type to unknown spaces, thereby enhancing the utility of the map.

Example Maps

FIG. 1 depicts an example determination of room types for regions of a map according to an example embodiment of the present disclosure.

In particular, FIG. 1 depicts a first map 102 that includes a floorplan of a building. The map 102 shows spatial boundaries defining a plurality of rooms, such as rooms 104 and 106. However, the map 102 does not provide any additional contextual information (e.g. room type) for the rooms 104 and 106. While the map 102 may provide some utility, a user of map 102 is generally unable to use map 102 for most meaningful functions. As an example, map 102 would provide little assistance for a user attempting to find a restroom, elevator, conference room, or other room of a particular room type.

According to an aspect of the present disclosure, a combination of geolocation, audio sampling and signaling, and digital signal processing can be used to identify a room type for one or more rooms of the building depicted by map 102. In particular, client computing devices located within room 104 may periodically collect audio samples of ambient audio in room 104. The audio samples can be analyzed to determine room characteristics.

As an example, audio sample analysis may reveal that room 104 is large, includes occasional conversation, includes music sounds, includes periodic mechanical whirring sounds, and includes periodic sounds of metal against metal. Such characteristics can be provided to a central server system. Considering received room characteristics in aggregate (and potentially in combination with other information such as hours of use and characteristics of the users who visit such room), the servers may determine that room 104 is a fitness center. Such room type information can be added to the map to provide additional utility.

As an example, FIG. 1 also depicts a map 152 in which room type information has been added to the building depicted in map 102. For example, map 152 indicates textually that room 154 is a fitness center and room 156 is a conference room. Likewise, map 152 indicates using icons that room 158 is a men's restroom; room 160 is a women's restroom; and room 164 is an elevator. Map 158 indicates using an icon that room 162 includes a staircase and also indicates textually that room 162 includes an entrance/exit for the building. Map 152 provides room type context for other rooms as well (e.g. a vending machine room which may be characterized by short stay, a restricted area potentially within a larger room or region, and characteristic vending machine sounds).

Example Systems

Figure 2:
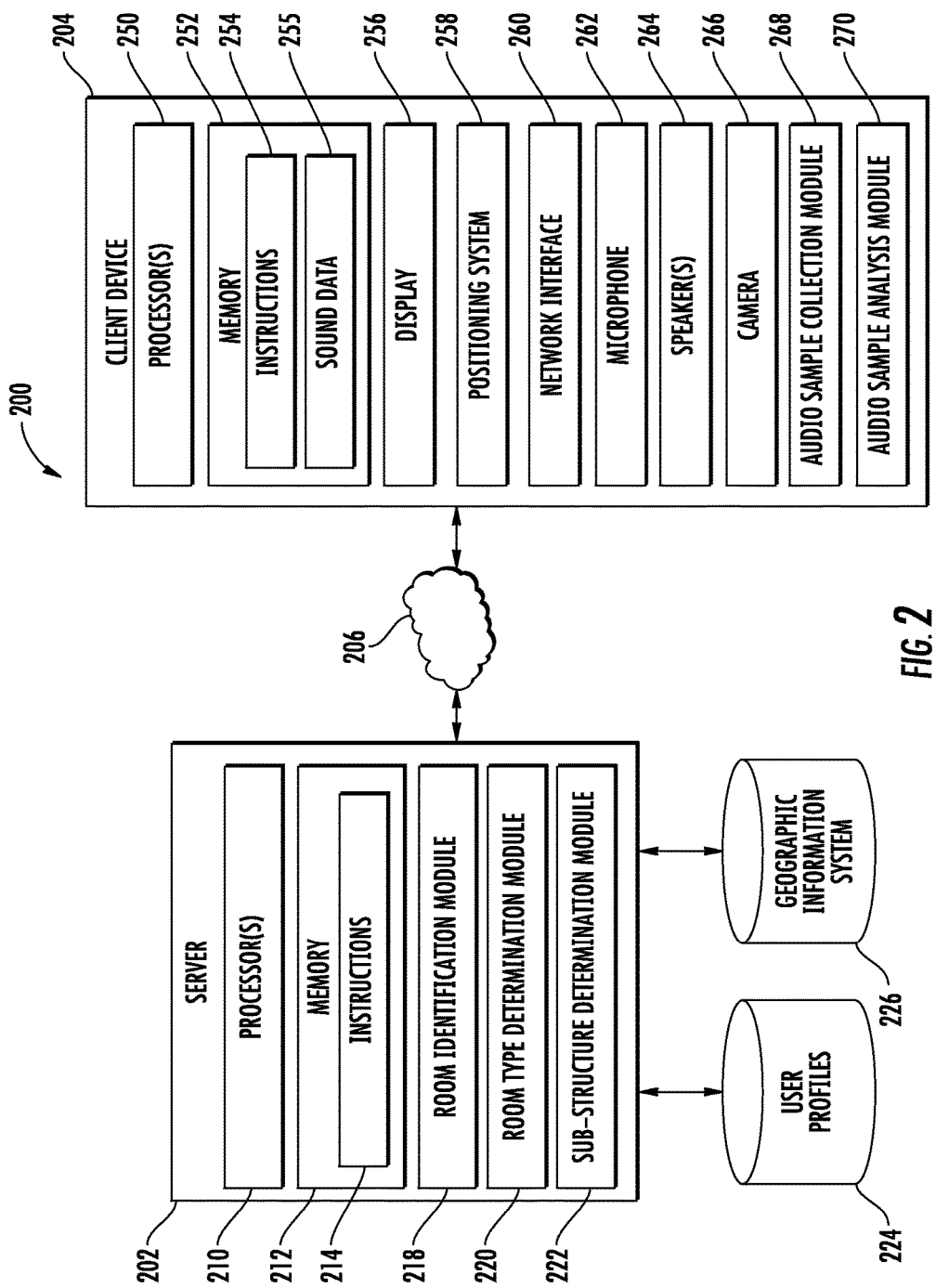
FIG. 2 depicts an example system according to an example embodiment of the present disclosure.

FIG. 2 depicts an example system 200 according to an example embodiment of the present disclosure. System 200 can include a client-server architecture, where a server 202 communicates with one or more client computing devices 204 over a network 206. Although a single client computing device 204 is illustrated in FIG. 2, any number of client computing devices can be connected to server 202 over network 206.

Server 202 can be implemented using one or more suitable computing devices. In the instance that server 202 is implemented using a plurality of computing devices, the functionality provided by server 202 can be performed according to any suitable computing architecture, including parallel computing architectures, sequential computing architectures, or some combination thereof.

Server 202 can include one or more processors 210 and one or more memories 212. Processor 210 can be any suitable processing device (e.g. integrated circuit, ASIC, microprocessor, central processing unit, etc.) and can be one processor or a plurality of processors which are operably connected. Memory 212 can be one or more non-transitory computer-readable media for storing information, such as, for example, RAM, ROM, flash memory, or other types of storage devices or storage components.

Figure 4:
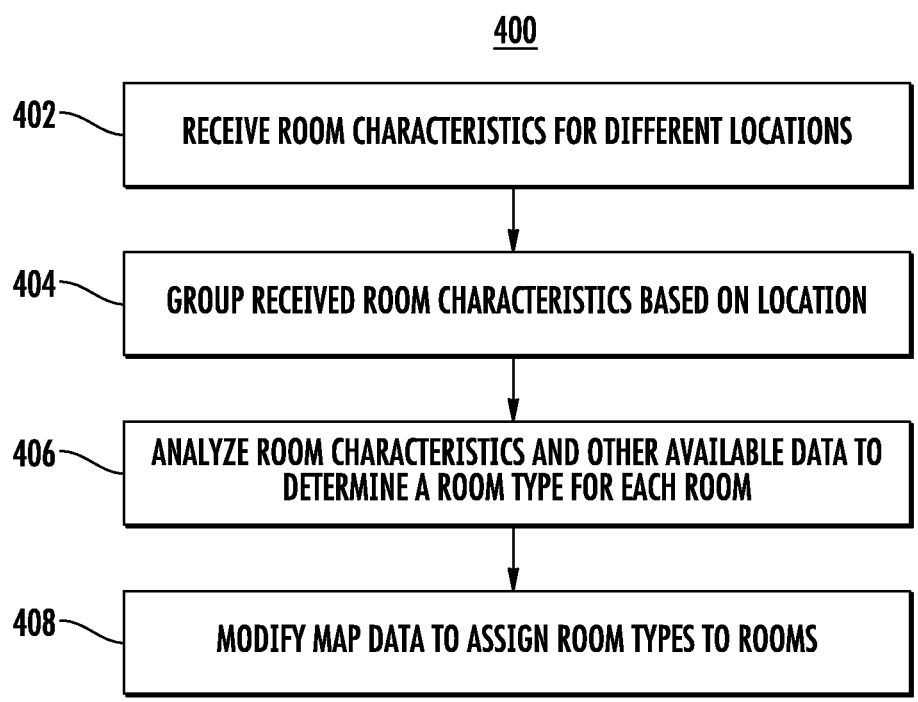
FIG. 4 depicts a flow chart of an example method for determining room types according to an example embodiment of the present disclosure.

Memory 212 can store instructions 214 that, when implemented by processor 210, cause server 202 to perform operations to implement the present disclosure, including, for example, performing aspects of method (400) of FIG. 4. Server 202 can communicate with client computing device 204 over network 206 by sending and receiving data.

Server 202 can also include various modules that, when implemented, cause server 202 to perform certain functionality. In particular, in some embodiments, server 202 can include a room identification module 218, a room type determination module 220, and a sub-structure determination module 222.

As used herein, the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

Server 202 can implement room identification module 218 to identify one or more rooms or regions to which received room characteristics correspond. As an example, server 202 can periodically receive room characteristics uploaded by a client computing device. A location can be determined for each uploaded room characteristic. For example, the location can be provided by the client computing device along with the uploaded room characteristics. Alternatively or additionally, the location may have been provided by the client computing device to a different set of server computing devices that collect location readings to maintain a location history for the client computing device. In such embodiments, server 202 can implement room identification module 218 to obtain the location associated with the room characteristics from the location history based on an upload time or an audio sampling time associated with the room characteristics.

The location can be a fine-grained geolocation that includes, for example, vertical information such as elevation or an indication of a floor level. In some embodiments, the server 202 can consult a preexisting indoor map that includes boundaries defining a plurality of rooms. In other embodiments, the indoor map may simply divide a building into a series of regions that are subject to refinement based on the uploaded room characteristics or audio samples. Server 202 can implement room identification module 218 to compare the location associated with each set of room characteristics to the indoor map to identify one or more rooms or regions to which such set of room characteristics correspond. In such fashion, the received uploads can be segmented or otherwise sorted into groups that respectively correspond to the plurality of rooms.

Server 202 can implement room type determination module 220 to determine a room type for a room or region in light of a plurality of received room characteristics describing the room. As an example, certain combinations of characteristics may indicate that the room is of a particular type. Thus, server 202 can implement room type determination module 220 to compare combinations of received room characteristics to a plurality of room type models that respectively define various combinations of characteristics that correspond to different rooms.

As another example, in some embodiments, room type determination module 220 can include or otherwise be in operative communication with a classifier that has undergone supervised training on room characteristic data associated with known room types. In such embodiments, room type determination module 220 may employ the classifier to classify a set of room characteristic data received for a particular room into one of a plurality of different room types.

Server 202 can implement sub-structure determination module 222 to identify the location of various sub-structures within a room. For example, sub-structure determination module 222 can be implemented to communicate with one or more client computing devices 204 that are located within a room having a known type. The sub-structure determination module 222 can instruct the client computing device 204 to listen for one or more specific sounds that respectively correspond to one or more sub-structures that would be expected to be included in such known room type.

The sub-structure determination module 222 may use data received from the client computing device 204 to identify the location of various sub-structures within the room. For example, the received data can include the location and/or orientation of the client computing device 204 when the client computing device 204 hears the specific sound. In some embodiments, depth data obtained via a camera of the client computing device 204 may be used by sub-structure determination module 222 to identify spatial dimensions of a room (e.g. boundaries of the room) or other spatial characteristics of the sub-structures.

Server 202 can also be coupled to or in communication with one or more databases, including a database providing user profiles data 224, a geographic information system 226, and/or other sources of various data. Although databases 224 and 226 are depicted in FIG. 2 as external to server 202, one or more of such databases can be included in memory 212 of server 202. Further, databases 224 and 226 can each correspond to a plurality of databases rather than a single data source.

In some embodiments of the present disclosure, user profiles database 224 can store or provide a plurality of location histories respectively associated with a plurality of users. In particular, when a user elects to participate and has signed into her user account into one of her computing devices, then such user computing device can periodically send a location update to server 202. Alternatively, the user location histories can be built and maintained by a computing system that is separate and unique from server 202 and the user location histories can simply be accessed by server 202.

For example, each location update can identify the presently active user account and a location (e.g. latitude and longitude) and a timestamp identifying the date and time of day. In some implementations, location updates can further include an accuracy indicator and/or other identifying information such as an originating IP address or a WiFi or cell tower identifier.

Thus, in some embodiments, in order to obtain the benefits of the techniques described herein, the user may be required to install an application and/or select a setting to allow the collection and analysis of location information associated with the user or her device. If the user does not, then the benefits of the techniques described herein may not be received.

Additional information can be used to build or supplement a user location history as well. As an example, whenever a user is logged into a user account and performs a web search or uses one or more applications, such as a mapping application, it is possible that such interaction can result in obtaining the user's location. Therefore, an entry can be formed in the associated user location history based on such interaction. As another example, if a user provides consent, transaction data from a digital wallet can be used to identify locations visited by the user.

All received location updates can be stored and associated with a particular user so that a user location history is built over time. Furthermore, in the event that the location reports provided by the user computing device 204 simply provide a geo-location (e.g. a latitude and longitude), one or more algorithms or processes can be applied to such location data to identify a particular point of interest that the user likely visited. Thus, the user location history for each user can provide a history of visits by such user to points of interest over time.

Geographic information system 226 can store or provide geospatial data to be used by server 202. Example geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data. Geographic information system 226 can be used by server 202 to obtain and provide a map to a client computing device 204. Geographic information system 226 can further be used by server 202 identify particular regions of a map (e.g. rooms of an indoor map of building) to which received room characteristic data corresponds.

Client computing device 204 can be a computing device having a processor 250 and a memory 252, such as a wireless mobile device, a personal digital assistant (PDA), smartphone, tablet, laptop computer, desktop computer, computing-enabled watch, computing-enabled eyeglasses, embedded computing system, gaming console, or other such devices/systems. In short, client computing device 204 can be any computer, device, or system that can interact with the server 202 (sending and receiving data) to implement the present disclosure.

Processor 250 can be any suitable processing device (e.g. integrated circuit, ASIC, microprocessor, central processing unit, etc.) and can be one processor or a plurality of processors which are operably connected. Memory 252 can be one or more non-transitory computer readable medium for storing information, such as, for example, RAM, ROM, flash memory, or other types of storage devices or storage components.

Memory 252 can include instructions 254 that, when implemented by processor 250, cause client computing device 204 to perform operations to provide functionality. In some embodiments, memory 252 can include one or more application modules for implementing various applications at client computing device 204. For example, memory 252 can include a browser module for implementing a browser and/or a mapping application module for implementing a client computing device portion of a mapping application or geographic information system at the client computing device 204.

In some embodiments, memory 252 can also store sound data 255. For example, sound data 255 can describe one or more specific sounds for which client computing device 204 may be instructed to listen for by server 202 under certain circumstances. Alternatively or additionally, sound data 255 can include recorded audio samples of ambient audio. However, in other embodiments, collected audio samples are processed by client computing device 204 in real-time and are not stored, thereby increasing user privacy.

Client computing device 204 can include a display 256. Display 256 can be any component or grouping of components for displaying information, such as a map. In some embodiments, display 256 may be unnecessary or not included in client computing device 204.

Client computing device 204 can further include a positioning system 258. Positioning system 258 can determine a current geographic location of client computing device 204. As an example, the determined geographic location can be attached with identified room characteristics that are uploaded to server 202 by client computing device 204.

The positioning system 258 can be any device or circuitry for analyzing the position of the client computing device 204. For example, the positioning system 258 can determine actual or relative position by using a satellite navigation positioning system (e.g. a GPS system, a DGPS system, a Galileo positioning system, the GLObal Navigation satellite system (GLONASS), the BeiDou Satellite Navigation and Positioning system), an inertial navigation system, a dead reckoning system, based on IP address, by using multilateration, and/or proximity to cellular towers or WiFi hotspots, and/or other suitable techniques for determining position.

Client computing device 204 can further include a network interface 260. Network interface 260 can include any suitable components for interfacing with one more networks, including for example, transmitters, receivers, ports, controllers, antennas, or other suitable components.

Client computing device 204 can also include one or more microphones 262. Microphone 262 can be any suitable device or circuitry for converting received audio signals into an electrical signal or other computer-readable format. For example, microphone 262 can include an acoustic-to-electric transducer or other sensor. In some embodiments, a plurality of microphones 262 can be used to identify a location, relative to client device 204, from which a particular sound emanated.

Client computing device 204 can also include one or more speakers 264. Speaker 264 can be any device that produces an audio signal based on a received electrical signal. For example, speaker 264 can include an electric-to-acoustic transducer.

Client computing device 204 can also include one or more cameras 266. Camera 266 can capture or create photographs according to any camera technology (e.g. digital camera). Alternatively or additionally, in some embodiments, camera 266 can be used by client computing device 204 to provide other optical information such as brightness information or depth information. Thus, in some embodiments, camera 266 and associated software can be a depth sensor.

In some embodiments, client computing device 204 can also include a barometric pressure sensor (not shown). In such embodiments, client computing device 204 may use a change in barometric pressure data output by the barometric pressure sensor to detect a change in elevation due to stair or elevator usage. Such information may be useful for providing a fine-grained geolocation that includes, for example, vertical information such as elevation or an indication of a floor level.

According to an aspect of the present disclosure, client computing device 204 can also include an audio sample collection module 268. Audio sample collection module 268 can employ microphone 262 to periodically collect an audio sample describing ambient audio around the client computing device 204. For example, the microphone 262 can passively collect samples of the ambient audio.

As another example, in some embodiments, audio sample collection module 268 can collect the audio samples whenever the device 204 sounds an alert tone that indicates to a user of the client computing device 204 that a communication has been received at the client computing device 204. In particular, the collected audio sample can include an echo of the alert tone. Such echo can be indicative of certain room characteristics.

As another example, in some embodiments, audio sample collection module 268 can employ speaker 264 to periodically sound an exploratory noise, such as, for example, a ping noise, a chirp noise, or some other noise. In some embodiments, the exploratory noise can be an ultrasonic noise. In particular, audio sample collection module 268 can sound the exploratory noise and then collect an audio sample that includes an echo of the exploratory noise. Such echo can be indicative of certain room characteristics.

In some embodiments, audio sample collection module 268 can be configured to sound exploratory noises only when certain criteria are satisfied. For example, time of day, a volume of ambient noise, and/or recent motion of the client computing device 204 can be criteria that must be satisfied for audio sample collection module 268 to sound an exploratory noise. Thus, for example, audio sample collection module 268 may not sound an exploratory noise at midnight in a quiet room, but may sound the exploratory noise at noon in a room with one or more active conversations.

Client computing device 204 can also include an audio sample analysis module 270. Audio sample analysis module 270 can be implemented to analyze one or more of the obtained audio samples to identify one or more room characteristics associated with the current location of the client computing device 204.

As an example, audio sample analysis module 270 can analyze the audio samples to determine one or more spatial characteristics that describe spatial qualities of the current location of the client computing device 204. For example, the spatial characteristics can indicate whether the client computing device 204 is currently located in a large space, a small space, a long hallway with significant echo, or other spatial characteristics.

As another example, audio sample analysis module 270 can analyze the audio samples to determine one or more occupancy characteristics of the current location of the client computing device 204. The occupancy characteristics can describe a human occupancy associated with the current location of the client computing device 204. For example, the occupancy characteristics can indicate a number of people speaking, a volume at which people are speaking, a number of stationary people, and/or a number of moving people in the adjacent area.

As yet another example, in some embodiments, audio sample analysis module 270 can compare the audio samples to characteristic sound profiles for known sounds (e.g. silverware clinking, dryer or washer appliance sounds, vending machine sounds, sink sounds, elevator sounds, stairwell sounds, cafeteria sounds, etc.). As an example, in some embodiments of the present disclosure, audio sample analysis module 270 can include or otherwise be in operative communication with a classifier that has undergone supervised training on characteristic sound profile data associated with known sounds. In such embodiments, audio sample analysis module 270 may employ the classifier to classify an audio sample as containing one or more of such known sounds.

It yet further embodiments, given knowledge of the orientation of the client computing device 204 (e.g. obtained through accelerometer data, gyroscope data, or other techniques) audio sample analysis module 270 can use a plurality of microphones to spatially locate a sound with binaural location. For example, location of the sound can be performed similarly to human hearing and perception of location/directionality.

Network 206 can be any type of communications network, such as a local area network (e.g., intranet), wide area network (e.g., Internet), or some combination thereof and can include any number of wired or wireless links. In general, communication between the server 202 and a client computing device 204 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Example Methods

Figure 3:
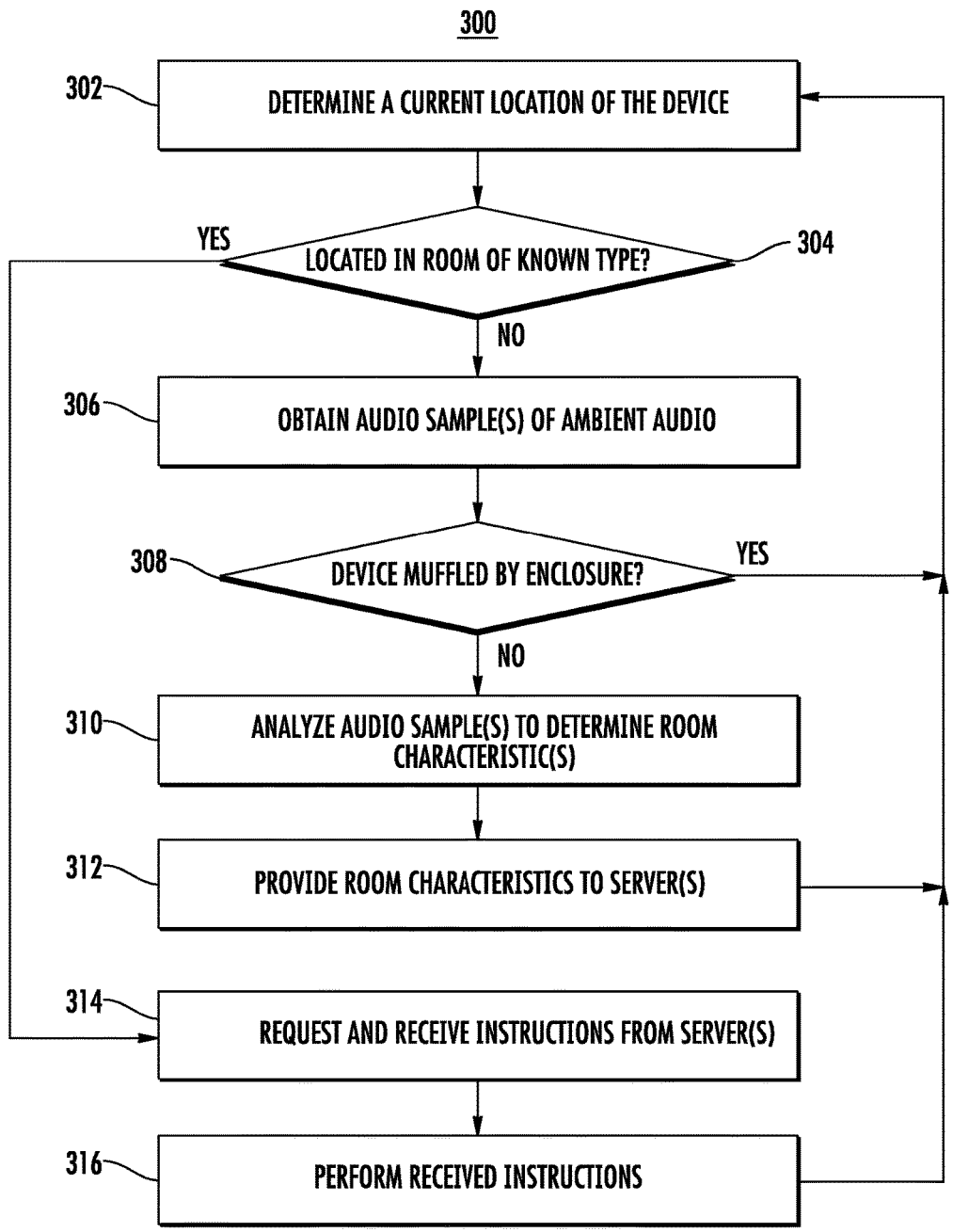
FIG. 3 depicts a flow chart of an example method for determining room types according to an example embodiment of the present disclosure.

FIG. 3 depicts a flow chart of an example method for determining room types according to an example embodiment of the present disclosure. Although example method (300) will be discussed with reference to system 200 of FIG. 2, method (300) can be implemented using any suitable computing system.

In addition, although FIG. 3 depicts steps performed in a particular order for purposes of illustration and discussion, various steps of the method (300) can be omitted, rearranged, combined, and/or adapted in various ways without deviating from the scope of the present disclosure.

At (302) a current location of a client computing device can be determined. For example, client computing device 204 may employ positioning system 258 to determine its current location. As another example, the current location of the client computing devices can be determined based on previous updates to a user location history. As yet another example, in some embodiments, the current location of the client computing device can be determined at (302) by receiving an indication of such location from a remote a supplemental system that has knowledge of such current location. Other methods for obtaining current location information may be used as well.

At (304) it can be determined whether the client computing device is located in a room of a known type. For example, client computing device 204 may consult an available map to determine whether the location determined at (302) corresponds to a room for which a room type has previously been assigned. Alternatively or additionally, client computing device 204 can provide the location determined at (302) to server 202. In response, server 202 may provide an indication to client device 204 as to whether the client computing device is located in a room of a known room type.

If it is determined at (304) that the client computing device is located in a room of a known type, then method (300) can proceed to (314). However, if it is determined at (304) that the client computing device is not located in a room of a known type, then method (300) can proceed to (306).

At (306) one or more audio samples of ambient audio around the client computing device can be obtained. For example, client computing device 204 can implement audio sample collection module 268 to collect one or more audio samples.

At (308) it can be determined whether the device is muffled by an enclosure. As an example, client computing device 204 can implement audio sample analysis module 270 to determine whether the device is muffled by an enclosure. For example, audio sample analysis module 270 can determine whether the most recently collected audio sample exhibits a characteristically muffled sound profile.

If it is determined at (308) that the device is muffled by an enclosure (such as a pocket or purse), then method (300) can return to (302) and begin method (300) again. In such fashion, room characteristic analysis can be limited to client computing devices that are able to collect audio samples with sufficient clarity.

However, if it is determined at (308) that the device is not muffled by an enclosure, then method (300) can proceed to (310).

At (310) the one or more audio samples obtained at (306) can be analyzed to determine one or more room characteristics. For example, client computing device 204 can implement audio sample analysis module 270 to determine one or more room characteristics based at least in part on the one or more audio samples obtained at (306).

At (312) the room characteristics determined at (310) can be provided to one or more servers. For example, client computing device 204 can upload the room characteristics to server 202. The location determined at (302) may or may not be included with such upload.

After (312), method (300) can return to (302) and begin method (300) again. In such fashion, client computing device 204 can periodically collect audio samples and analyze such audio samples to provide room characteristics data for various different locations in which client computing device 204 is located.

Referring again to (304), if it is determined at (304) that the client computing device is located in a room of a known type, then method (300) can proceed to (314).

At (314) the client computing device can request and receive instructions from the servers. For example, client computing device 204 can request instructions from server 202. In response, the server 202 may instruct the client computing device 204 to listen for one or more specific sounds, to perform an extended listening session, or other instructions that may or may not be specific to the particular known room type in which the client computing device 204 is located.

At (316) the client computing device can perform the received instructions. For example, the client computing device 204 may perform an extended listening session to listen for one or more specific sounds. When the client computing device 204 hears one of the one or more specific sounds, it may provide an indication to the server 202. Such indication may include its current location and/or orientation and/or data collected by a camera (e.g. depth data). After (316), method (300) can return to (302) and begin method (300) again.

FIG. 4 depicts a flow chart of an example method for determining room types according to an example embodiment of the present disclosure. Although example method (400) will be discussed with reference to system 200 of FIG. 2, method (400) can be implemented using any suitable computing system.

In addition, although FIG. 4 depicts steps performed in a particular order for purposes of illustration and discussion, various steps of the method (400) can be omitted, rearranged, combined, and/or adapted in various ways without deviating from the scope of the present disclosure.

At (402) one or more room characteristics can be received for different locations. For example, server 202 can receive room characteristics from a plurality of different client computing devices 204. The received room characteristics may correspond to a plurality of different locations.

At (404) the received room characteristics can be grouped based on location. For example, server 202 can implement route identification module 218 to identify a room or region for which each received room characteristic corresponds. Thus, received room characteristics can be grouped or otherwise organized based on location (e.g. on a room-by-room basis).

At (406) one or more groups of room characteristics and other available data can be analyzed to determine a room type for one or more regions of a map. For example, server 202 can implement room type determination module 220 to determine a room type for a room based at least in part on all room characteristics received for such room. Other forms of data such as, for example, imagery captured by the client computing devices 204, device user characteristics, device location histories, device orientation data, or other information can be used in combination with the room characteristics data to determine room types.

At (408) map data can be modified to assign the determined room types to the regions of the map. For example, server 202 can communicate with geographic information system 226 to modify map data so as to assign the determined room types to their corresponding regions on one or more maps. In such fashion, the systems and methods of the present disclosure can be used to determine room types for regions of a map, such as rooms of an indoor map, thereby enhancing the utility of the map.

ADDITIONAL EMBODIMENTS

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. Distributed systems may be located in one or more physical locations.

While the present subject matter has been described in detail with respect to specific example embodiments and methods thereof, those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent to one of ordinary skill in the art.

What is claimed is:

1. A system for determining room types, the system comprising:
one or more server computing devices, wherein the server computing devices perform operations, the operations comprising:
receiving room characteristics for a plurality of different locations from a plurality of client computing devices, wherein the plurality of different locations respectively correspond to a plurality of different rooms of one or more buildings;
identifying all received room characteristics for a first room of the plurality of rooms; and
determining a first room type for the first room based at least in part on the received room characteristics for the first room;
wherein the operations further comprise, when a first client computing device of the plurality of client computing devices is located in a second room for which a second room type has been previously determined:
requesting that the first client computing device listen for one or more specific sounds associated with one or more sub-structures associated with the second room type;
receiving an indication from the first client computing device when the first client computing device hears one of the one or more specific sounds; and
determining a location of a particular sub-structure of the second room based at least in part on the indication received from the first client computing device, the particular sub-structure associated with the specific sound heard by the first client computing device.

2. The system of claim 1, wherein determining the first room type for the first room based at least in part on the received room characteristics for the first room comprises:
using a classifier to classify the first room into one of a plurality of different room types to identify the first room type, the classifier having been trained on room characteristic data having a known room type of the plurality of different room types.

3. The system of claim 1, wherein identifying all received room characteristics for a first room of the plurality of rooms comprises:
determining, for each room characteristic received from one of the plurality of client computing devices, an associated room of the plurality of different rooms by comparing the current location of such client computing device to a preexisting indoor map.

4. The system of claim 1, wherein determining the first room type for the first room based at least in part on the received room characteristics for the first room comprises:
comparing the received room characteristics for the first room to a plurality of room type models that respectively define various combinations of characteristics that correspond to the plurality of different room types.

5. The system of claim 1, wherein:
when the respective current locations of the first and second client computing device are within a threshold distance from each other:
the first client computing device is configured to sound an exploratory noise;
the second client computing device is configured to listen for the exploratory noise and indicate to the one or more server computing devices whether it has heard the exploratory noise; and the one or more server computing devices are configured to use the indication of whether the second client computing device has heard the exploratory noise to identify one or more room boundaries.

6. The system of claim 1, wherein:

receiving the indication from the first client computing device comprises receiving a current location and a current orientation of the client computing device when the first client computing device heard the one of the one or more specific sounds; and determining the location of the particular sub-structure of the second room based at least in part on the indication received from the first client computing device comprises determining the location of the particular sub-structure of the second room based at least in part on the current location and the current orientation of the client computing device when the first client computing device heard the one of the one or more specific sounds.

7. The system of claim 1, wherein the operations further comprise:

performing indoor routing or robotic pathway determination based at least in part on the first room type determined for the first room.

8. A computer-implemented method for determining room types, the method comprising:

determining, by one or more computing devices, a current location of a client computing device;

obtaining, by the one or more computing devices, one or more audio samples describing ambient audio around the client computing device;

identifying, by the one or more computing devices, one or more room characteristics associated with the current location of the client computing device based at least in part on the one or more audio samples;

identifying, by the one or more computing devices, a room type for a room associated with the current location of the client computing device based at least in part on the one or more room characteristics; and modifying, by the one or more computing devices, map data to associate the room type with the room;

wherein identifying, by the one or more computing devices, the one or more room characteristics associated with the current location of the client computing device comprises:

analyzing, by the client computing device the one or more audio samples to determine whether the one or more audio samples include human speech;

in response to a first determination that the one or more audio samples include human speech:

analyzing, by the client computing device, the one or more audio samples to identify the one or more room characteristics associated with the current location of the client computing device; and uploading, by the client computing device, the one or more room characteristics to a server computing device; and in response to a second determination that the one or more audio samples do not include human speech:

uploading, by the client computing device, the one or more audio samples to the server computing device;

wherein the server computing device analyzes the one or more audio samples to identify the one or more room characteristics associated with the current location of the client computing device.

9. The computer-implemented method of claim 8, wherein the one or more room characteristics comprise one or more spatial characteristics that describe spatial qualities of the current location of the client computing device.

10. The computer-implemented method of claim 8, wherein the one or more room characteristics comprise one or more occupancy characteristics that describe a human occupancy associated with the current location of the client computing device.

11. The computer-implemented method of claim 8, wherein obtaining, by the one or more computing devices, one or more audio samples describing ambient audio around the client computing device comprises:

sounding, by the client computing device, an alert tone to indicate to a user of the client computing device that a communication has been received at the client computing device; and collecting, by the client computing device, the one or more audio samples after sounding the alert tone, such that the one or more audio samples include an echo of the alert tone.

12. The computer-implemented method of claim 8, wherein obtaining, by the one or more computing devices, one or more audio samples describing ambient audio around the client computing device comprises:

sounding, by the client computing device, an exploratory noise; and collecting, by the client computing device, the one or more audio samples after sounding the exploratory noise, such that the one or more audio samples include an echo of the exploratory noise.

13. The computer-implemented method of claim 8, wherein the exploratory noise is sounded only when the client computing device has moved within a threshold period of time or when an ambient noise level exceeds a threshold level.

14. The computer-implemented method of claim 8, further comprising:

receiving, by the client computing device, instructions from a server computing device to listen for one or more specific sounds;

listening, by the client computing device, for the one or more specific sounds; and providing, by the client computing device, an indication to the server computing device when the one or more specific sounds are heard.

15. The computer-implemented method of claim 8, wherein identifying, by the one or more computing devices, the room type for the room based at least in part on the one or more room characteristics comprises identifying, by the one or more computing devices, the room type for the room based at least in part on the one or more room characteristics and further based at least in part on location histories for a plurality of client computing devices that visited the room.

16. The one or more non-transitory computer-readable media of claim 15, wherein identifying, by the one or more computing devices, the room type for the room based at least in part on location histories for a plurality of client computing devices that visited the room comprises:

determining, by the one or more computing devices, hours of use for the room based at least in part on the location histories for the plurality of client computing devices; and identifying, by the one or more computing devices, the room type for the room based at least in part on the hours of use for the room.

17. The computer-implemented method of claim 8, wherein determining, by the one or more computing devices, the current location of the client computing device comprises:
   receiving, by the one or more computing devices, vertical information that indicates one or more of an elevation and a floor level of the client computing device; and
   identifying, by the one or more computing devices, the room based at least in part on the vertical information and based at least in part on a floorplan.

18. One or more non-transitory computer-readable media storing instructions that, when executed by one or more computing devices, cause the one or more computing devices to perform operations, the operations comprising:
   determining a current location of a client computing device;
   collecting an audio sample describing audio occurring at the current location, wherein collecting the audio sample describing audio occurring at the current location comprises:
      receiving, by the client device, a communication intended for the user of the client computing device;
      sounding, by the client computing device, an alert tone to indicate to the user of the client computing device that the communication has been received, wherein the communication is unrelated to the collection of the audio sample; and
      listening, by the client computing device, for an echo of the alert tone;
   determining one or more room characteristics based at least in part on the audio sample; and
   providing the one or more room characteristics and the current location to one or more server computing devices;
   wherein the one or more server computing devices identify a room based at least in part on the current location and determine a room type for the room based at least in part on the one or more room characteristics.

19. The one or more non-transitory computer-readable media of claim 18, wherein analyzing the audio sample to determine the one or more room characteristics comprises analyzing the audio sample to determine one or more occupancy characteristics, the occupancy characteristics describing a number of people occupying a space around the current location.

20. The one or more non-transitory computer-readable media of claim 18, wherein the communication comprises an incoming call, an incoming text message, or a received electronic mail message.

* * * * *